Figure 9:
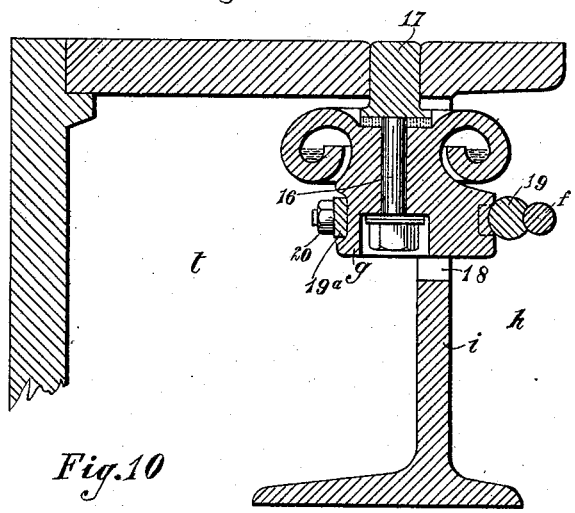

No. 689,653. Patented Dec. 24, 1901.
W. B. SAYERS.
ELECTRIC TRAMWAY OR STREET RAILWAY.
(Application filed Jan. 21, 1901.)
(No Model.) 5 Sheets—Sheet 1.
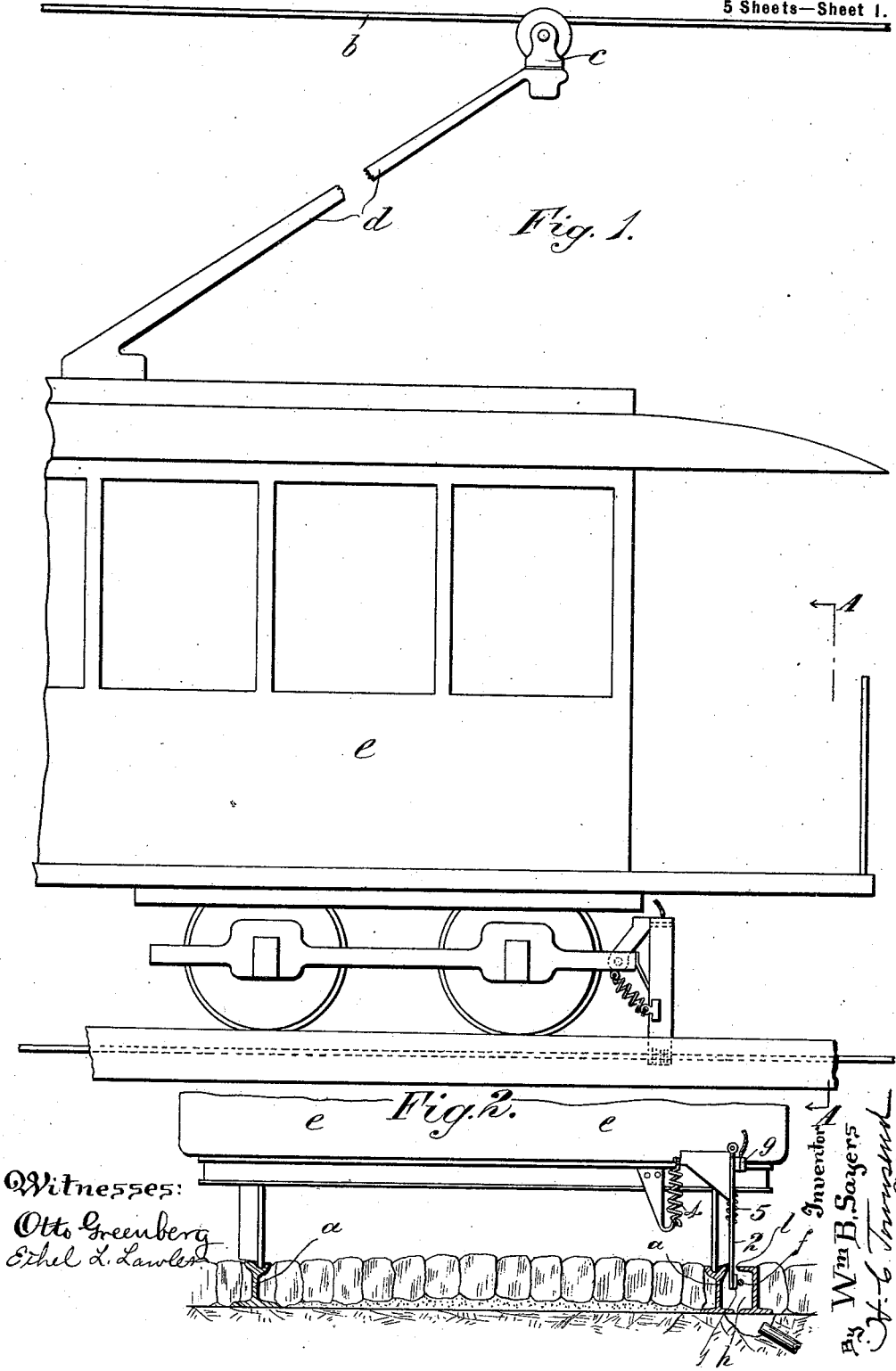

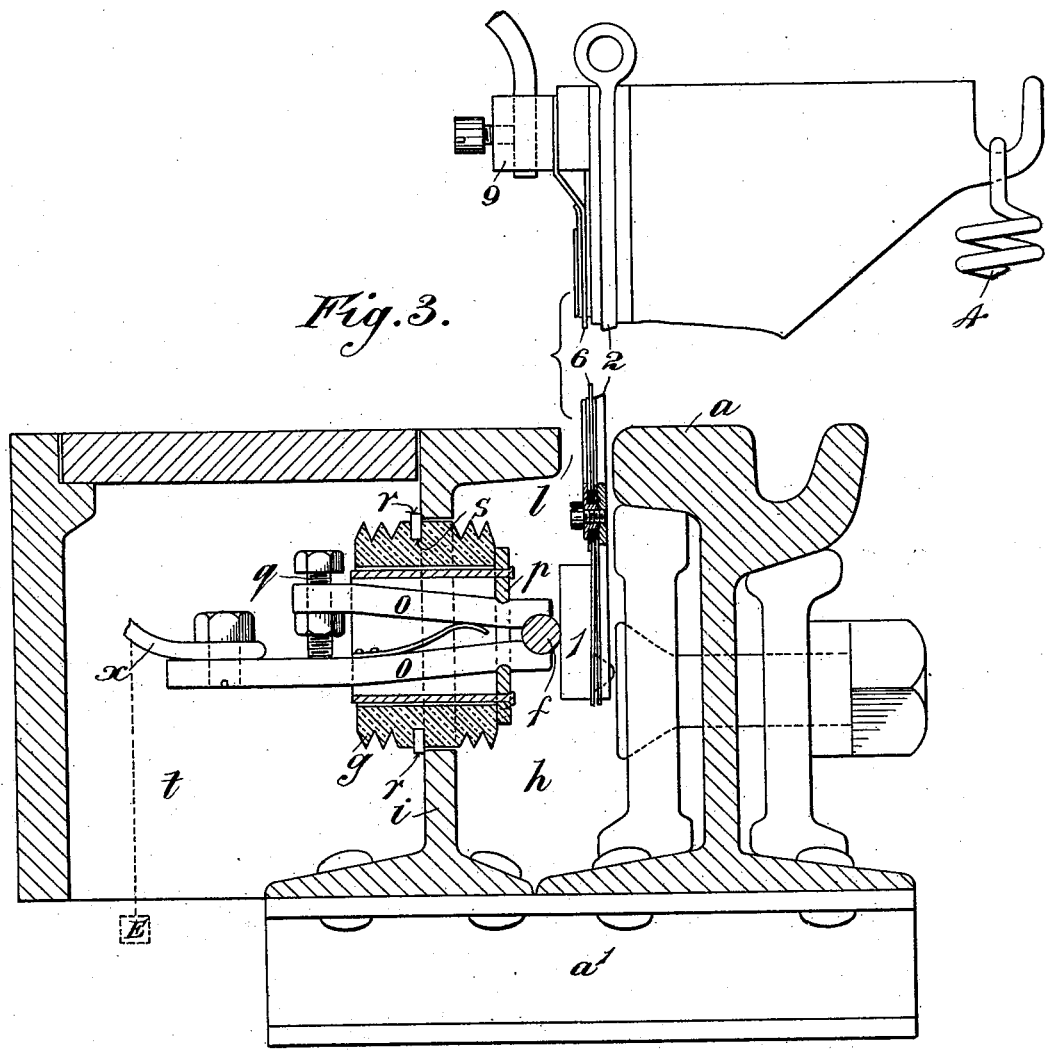

No. 689,653. Patented Dec. 24, 1901.
W. B. SAYERS.
ELECTRIC TRAMWAY OR STREET RAILWAY.
(Application filed Jan. 21, 1901.)
(No Model.) 5 Sheets—Sheet 3.
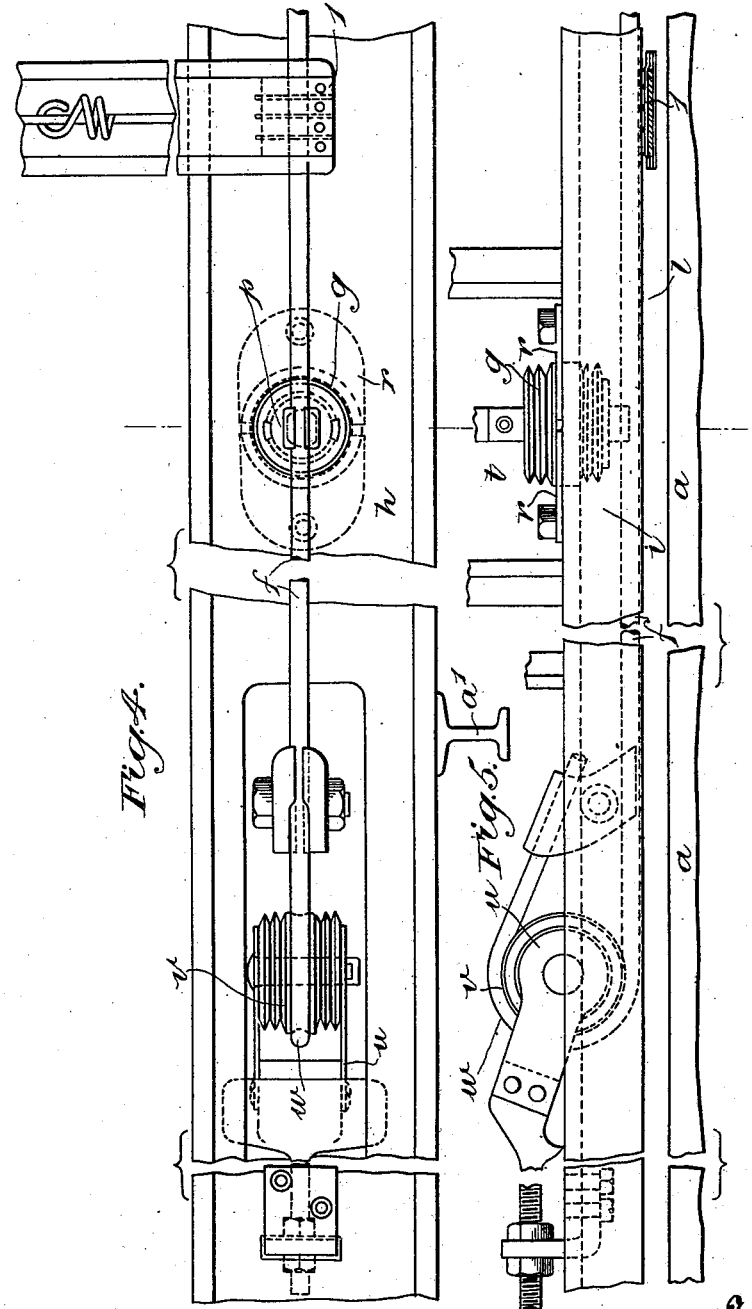
Witnesses:
Otto Greenberg
Ethel L. Lawler
Inventor
Wm B. Sayers
By H. C. Townsend
Attorney
THE NORRIS PETERS CO., PHOTO-LITHO., WASHINGTON, D. C.

No. 689,653. Patented Dec. 24, 1901.
W. B. SAYERS.
ELECTRIC TRAMWAY OR STREET RAILWAY.
(Application filed Jan. 21, 1901.)
(No Model.) 5 Sheets—Sheet 4.
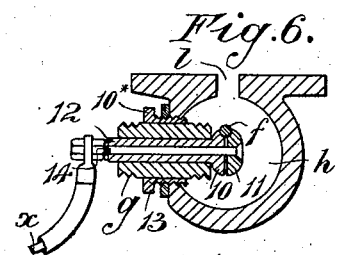
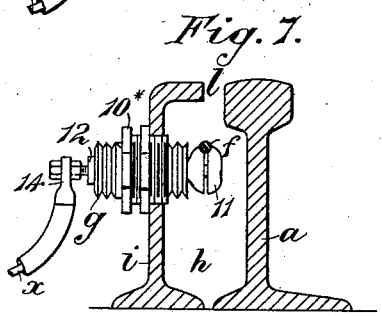
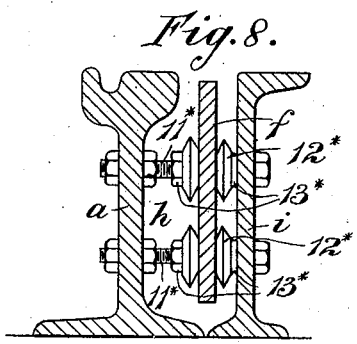
Witnesses:
Otto Greenberg
Ethel L. Lawler
Inventor
Wm B. Sayers
By
Attorney No. 689,653. Patented Dec. 24, 1901.
W. B. SAYERS.
ELECTRIC TRAMWAY OR STREET RAILWAY.
(Application filed Jan. 21, 1901.)

(No Model.) 5 Sheets—Sheet 5.

Witnesses:
Otto Greenberg
Ethel L. Lawler

Inventor
Wm B. Sayers
By J. C. Townsend
Attorney

UNITED STATES PATENT OFFICE.

WILLIAM BROOKS SAYERS, OF GLASGOW, SCOTLAND.

ELECTRIC TRAMWAY OR STREET-RAILWAY.

SPECIFICATION forming part of Letters Patent No. 689,653, dated December 24, 1901.

Application filed January 21, 1901. Serial No. 44,018. (No model.)

*To all whom it may concern:*

Be it known that I, WILLIAM BROOKS SAYERS, a subject of the Queen of Great Britain, residing at Glasgow, in the county of Lanark, Scotland, have invented Improvements in or Relating to Electric Tramways or Street-Railways, of which the following is a specification.

This invention has for its object to avoid the difficulties, such as the corrosion of water or other pipes or other metallic structures buried in the earth and the disturbance of telegraph or telephone circuits and electrical and magnetic apparatus by stray or leakage currents from the rails, that at present arise in connection with those systems of electric tramways or street-railways in which the main or supply conductors are overhead and the track-rails are employed for the return-conductor. For this purpose, according to the present invention, the return-conductor of an overhead or trolley system of electric tramways or street-railways is carried on insulators in a small open-slot conduit which may be separate from and laid parallel to the track-rails or be formed by and between one of the track-rails and a separate rail, a slider or brush carried by the car and extending through the slot in the conduit being adapted to make contact with the insulated return-conductor, so as to electrically connect the same to one terminal of the car-motors, the other terminal of which is connected through the trolley or other means with the overhead conductor, the return-conductor being earthed at a point preferably at or near the generating-station when a continuous-current supply is employed, or at the transforming or substation when power is generated at a distance and is delivered to the transforming or sub station at a higher pressure than that which is used on the line, so that the difference of potential in each case between the return-conductor and the sides of the conduit is limited to or is not greater than that due to the fall of potential in the said return-conductor. In consequence, therefore, of the small difference of potential between the return-conductor and the conduit and of the fact that a small and therefore comparatively inexpensive construction of conduit can be used the objections such as have heretofore been raised to the employment of an open-slot conduit system disappear.

Figure 10:
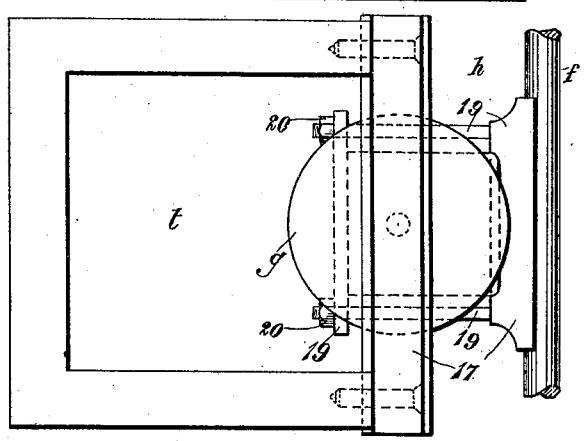

In the accompanying illustrative drawings, Figure 1 shows in side-elevation, and Fig. 2 in cross-section on the line A A of Fig. 1, part of an electric tramway with car according to this invention. Fig. 3 shows the return-conductor, conduit, and adjacent parts in cross-section and to a larger scale than Figs. 1 and 2. Fig. 4 shows in side elevation different portions of the length of the inner side of the conduit with attached parts shown in Figs. 1, 2, and 3, and Fig 5 is a corresponding part plan. Figs. 6, 7, and 8 are cross-sections showing modified constructions. Figs. 9 and 10 are respectively a cross-section and a part plan showing a further modified construction.

$a\ a$ are the ordinary track-rails, and $b$ the overhead conductor, from which an electric current is supplied through a trolley $c$, trolley-arm $d$, and connections to the electric motors on the car $e$ in the ordinary manner.

$f$ is a special metallic return-conductor which may consist of a wire, strip, or bar of copper or other suitable metal of any desired cross-section and which is fixed or strained on and supported by insulated supports $g$ in a small open-slot conduit $h$ of suitable section laid in the roadway parallel with the track-rails $a$, with its upper surface level, or nearly so, with the surface of the roadway.

In Figs. 1 to 5 the conduit $h$ is formed by and between one of the track-rails $a$ and a separate guard-rail $i$, the flanged top of which is arranged to form with the top of the adjacent track-rail $a$ an open slot $l$. The return-conductor $f$ is supported at intervals of its length by clamps, each of which may conveniently consist of a pair of bars $o$, pivoted against opposite sides of a ring $p$ and caused to clamp the return-conductor $f$ between two of their ends by operating a set-screw $q$, passing through one and abutting against the other of their opposite ends. The ring $p$ and clamp are carried by an insulator $g$, that extends through the guard-rail $i$ and is fixed in position by a pair of plates $r$, that enter an annular groove $s$ in the insulator and are fixed to the said guard-rail. Boxes $t$, with removable covers, are provided for giving access to the insulators and attached parts and through which such insulators and attached parts can be inserted and removed and through which the clamps can be operated to grip or release the return-conductor. The return-conductor may conveniently be pulled tight by an endwise-adjustable device $u$, Figs. 4 and 5, provided with a roller $v$, that engages the looped end $w$ of the said conductor. The return-conductor $f$ is or may be connected at suitable intervals to return-feeders $x$ for limiting the difference of potential between it and the conduit $h$, the return-conductor or return conductor and feeders being earthed at one point, preferably at or near the generating-station, when a continuous-current supply is employed or at the transforming or sub station when power is generated at a distance and is delivered to the transforming or sub station at a higher pressure than that which is used on the line, so that the difference of potential in each case between the return-conductor and the sides of the conduit is limited to or is not greater than that due to the fall of potential in the said return-conductor, as and for the purpose hereinbefore stated.

The traveling contact or brush whereby the motors on each car are kept in electrical connection with the return-conductor is carried by but insulated from a thin support or hanger attach to the car and extending down through the slot in the top of the conduit, the said contact or brush being connected to the motors by one or more insulated conductors.

In Figs. 1 to 5 the traveling brush 1 is carried by a hanger 2, so mounted on the car $e$ that it can turn about a longitudinal axis and be pressed sidewise against the return-conductor $f$ by a spring 4 and can turn upward about a transverse axis and against the action of a spring 5 in the event of the brush meeting an obstruction in the conduit. The brush is connected by an insulated conductor 6 to a terminal 9, that is connected to the motors on the car.

As the conduit is small and does not extend much, if at all, below the bottom of the track-rails, it is evident that a conduit system according to this invention can be cheaply and strongly constructed and can be suitably connected to the drainage system of the roadway, so as to prevent its being flooded. Also it can be provided at intervals of its length with boxes or receptacles, into which dirt and other rubbish that may enter it can be readily transferred from time to time by suitable means, such as a rake or scraper, and from which such dirt or rubbish can be withdrawn through openings at the top that are normally closed by covers located in the roadway. Furthermore, it is not necessary that the return-conductor $f$ should be highly insulated, for no serious harm or interruption to the traffic will result even if accidental connection be made between the said conductor and the side of the conduit at some point through a piece of metal or through dirt getting into the conduit or through the conduit being flooded with water.

The conduit can be constructed and arranged in various ways.

In Figs. 1 to 5 the track-rail $a$ and guard-rail $i$, forming the conduit, are of the same height and bedded upon a concrete or like bed, the two rails being rigidly connected together at intervals by metal junction-pieces $a'$, which may conveniently be of T-section.

In Fig. 6 the conduit $h$ consists of a slotted tube arranged between and parallel to the track-rails $a$, the return-conductor $f$ being supported at intervals therein, as before, by insulators $g$, provided with clamps. The insulator $g$ shown is fixed to the conduit by a gland or ferrule 10*, that is screwed into a hole in the conduit, and each clamp comprises two jaws 10 and 11, carried, respectively, by a sleeve 12 and a rod 13, the former of which is fixed in the insulator and the latter of which can be drawn up by a nut 14, so as to clamp the return-conductor in position between the two jaws.

Fig. 7 shows another construction in which the conduit $h$ is formed by and between one of the track-rails $a$, which is rolled plain— $i.\,e.$, with a tread only at its upper side—and a guard-rail $i$, that is secured in position in such a manner that there is formed between them a slotted conduit, the slot $l$ of which serves also as a groove for the flanges of the car-wheels that run over it. The insulated return-conductor $f$ is shown held in position by a clamp and insulator, as in the construction shown in Fig. 6, the insulators being shown fixed to the guard-rail.

Fig. 8 shows another construction in which an ordinary track-rail $a$ is employed in conjunction with a guard-rail $i$ to form the conduit $h$, and the return-conductor $f$ is in the form of a metal plate placed rather lower than the under side of the tread of the track-rail. This return-conductor or insulated plate is carried on distance-bolts 11*, which pass through the track-rail $a$, insulated plate $f$, and guard-rail $i$, the holes through the conducting-plate $f$ being provided with bushes 12*, of insulating material, and the bushes being secured and held in place between the track and guard rails $a$ and $i$ by distance pieces or nuts 13*, of insulating material, on the distance-bolts 11*. The insulated plates may be bonded in the way that is common with track-rails when used as return-conductors and may be connected at intervals with return-feeders, so that the potential difference between the return-conductor and conduit may be limited to the desired value.

Figs. 9 and 10 show another construction in which the conduit $h$ is formed by and between one of the track-rails $a$ and a guard-rail $i$, as in Figs. 1 to 5, inclusive; but the insulators for supporting the return-conductor $f$ each comprise an oil-insulator $g$, carried by a bolt 16, formed in one with or secured to a carrying-bar 17, fixed to the upper part of the box $t$, the said insulator projecting through a hole 18 in the guard-rail $i$. The return-conductor $f$ is fixed, as by soldering, to a carrier, such as a yoke-piece 19, provided with a cross-piece $19^a$ and nuts 20, whereby it is fixed around the insulator $g$.

What I claim is—

1. In an overhead or trolley system of electric tramways or railways, an open-slot conduit arranged in the roadway parallel to the track-rails, and a return-conductor that is supported within but insulated from said conduit and is earthed at one point, substantially as described for the purpose specified.

2. In an overhead or trolley system of electric tramways or railways, an open-slot conduit arranged in the roadway parallel to the track-rails and formed by and between one of the track-rails and a guard-rail arranged adjacent thereto but so as to form a longitudinal slot between its upper end and the upper end of said track-rail, and a return-conductor supported within but insulated from said conduit and earthed at one point, substantially as described.

3. In an overhead or trolley system of electric tramways or railways, the combination with an overhead supply-conductor, means for conducting electricity therefrom to one pole of electric motors on a car, and a traveling contact or brush carried by said car and connected to the other pole of the motors, of an open-slot conduit arranged in the roadway parallel to the track-rails and through the slot in which said traveling contact or brush passes, and a return-conductor supported within but insulated from said conduit and against which said contact or brush can travel, said return-conductor being earthed at one point, substantially as described for the purpose specified.

4. In an overhead or trolley system of electric tramways or railways, the combination with an overhead supply-conductor, means for conducting electricity therefrom to one pole of electric motors on a car, and a traveling contact or brush carried by said car and connected to the other pole of the motors and capable of turning sidewise about a longitudinal axis and upward about a transverse axis, of an open-slot conduit arranged in the roadway parallel to the track-rails and into which said traveling contact or brush extends, a return-conductor supported within but insulated from said conduit and against which said traveling contact will bear, and return-feeders connected at intervals to said return-conductor and earthed at one point, substantially as described for the purpose specified.

Signed at Glasgow, Scotland, this 31st day of December, 1900.

WILLIAM BROOKS SAYERS.

Witnesses:
GEO. McDONALL,
JOHN M. MACNAIR.